United States Patent Office 3,437,490
Patented Apr. 8, 1969

3,437,490
TWO STAGE FERMENTATION PROCESS FOR BEER
Orland Otto Schaus and Antonios Papadopoulos, Toronto, Ontario, Canada, assignors to Canadian Breweries Limited, Toronto, Ontario, Canada
No Drawing. Filed Apr. 9, 1965, Ser. No. 447,051
Claims priority, application Canada, Mar. 25, 1965, 926,503
Int. Cl. C12c *11/04*
U.S. Cl. 99—31                          4 Claims

ABSTRACT OF THE DISCLOSURE

This invention relates to the making of beer or the like wherein the brewers' wort is fermented at a high pitching rate and the fermentation is carried out in two temperature stages, the first stage being at a low temperature to inhibit the production of off flavours and lasting until the yeast propagation is completed, the second stage commencing at the end of yeast propagation and extending until the end of fermentation and being at a higher temperature to secure an accelerated fermentation. The invention makes it possible to achieve the advantages of accelerated fermentation from a production point of view without the disadvantage of off flavour beer.

---

This invention relates to the fermenting of a yeast fermentable substrate in the production of a potable beverage, such as beer.

During the past ten years, concentrated effort has been expanded by the brewing industry in an effort to reduce the fermentation time in the production of beer from brewer's wort. Common to many of the new methods are the expedients of higher yeast concentrations, higher fermentation temperatures and agitation of the fermenting wort to maintain the yeast in suspension. With the use of these devices it is not difficult to substantially reduce the fermentation time of wort in the manufacture of beer, but in all cases the beer contains objectionable amounts of materials that impart flavours called aromatic, caramelized, estery or fruity. These flavours are so objectionable that brewers have not adopted the modern fast fermenting techniques.

It is therefore an object of this invention to devise a method for producing a potable beverage, such as beer, by the fermentation of a yeast fermentable substrate, such as wort, wherein relatively high yeast concentration and high temperatures are used to shorten the fermentation time but in which noticeable objectionable flavours are not imparted to the resulting beer.

The method of the invention has application to cases where relatively high yeast concentrations and agitation of the substrate are used and, generally speaking, comprises the steps of pitching the substrate with a yeast at a concentration of at least 3 grams of yeast per litre of substrate, agitating the substrate to keep the yeast in suspension, maintaining the temperature of the substrate relatively low during the initial stages of fermentation, and subsequently, and after yeast propagation of the fermentation process is substantially completed as determined by a levelling off of increase in yeast concentration caused by the attainment of a substantially anaerobic condition in the wort, raising the temperature of the substrate substantially to accelerate the fermentation processes. The temperature is maintained low during the initial stages of the fermentation process while the yeast propagation is taking place to reduce the formation of the objectionable aromatic flavours. Once the propagation stage is completed, it is permissible to take full advantage of the accelerated fermentation techniques that have been used to a somewhat limited extent, as indicated above, by raising the temperature to accelerate the fermentation process. The temperature in the initial stages of fermentation will vary somewhat with the type of yeast used. Wort pitched with ale yeasts, which are generally described as top fermenting, give a satisfactory product insofar as aromatic flavours are concerned, if maintained below 65° F. during the initial stages of fermentation where yeast propagation takes place and are subsequently raised in temperature. Wort pitched with lager yeasts, which generally speaking are described as bottom fermenting yeasts, must be maintained at a somewhat lower temperature during the initial stages of fermentation and usually below 55° F. The temperature of the fermenting substrate depends to some extent upon the freedom from aromatic flavours that is desired in the end product, as well as the type of yeast used. In each case, however, the object and technique of the invention is the same. The object is to take advantage of the accelerated fermentation techniques employing high temperatures, agitation, and high yeast concentrations, and at the same time to avoid aromatic flavours. The technique is to maintain the temperature low during the critical initial part of the fermentation when yeast propagation is taking place, but to subsequently raise the temperature to accelerate the fermentation after the propagation is substantially completed.

Following are a number of examples of batch fermentations which illustrate the invention.

Two fermenters were filled to 200 gallons with ale wort, filter at 62° F. and pitched with washed yeast at that temperature. The fermenters were mechanically agitated to maintain all of the yeast in suspension in the substrate. The temperature in each case was permitted to rise uncontrolled to about 70° F., as appears from the measurements taken in the charts which follow. The charts give measurements of the parameters indicated.

FERMENTER NO. 1
[4 gr. yeast/litre pitched—agitated]

| Hours | Temp., °F. | Gravity, °Plato | pH | Yeast Concentration, gr./litre |
|---|---|---|---|---|
| 0 | 62 | 11.5 | 4.95 | 5 |
| 11½ | 66 | 10.55 | 4.45 | 12 |
| 18½ | 70 | 8.6 | 4.25 | 22 |
| 23¾ | 70½ | 6.3 | 4.10 | 28 |
| 29 | 70½ | 4.3 | | 30 |
| 34 | 70½ | 3.15 | | 30 |
| 36 | 70½ | 2.75 | | |
| 37 | 70½ | 2.4 | | ¹ 30 |
| 41 | 45 | | | (²) |
| 41½ | 45 | | | ³ 1½ |

¹ Start cooling.   ² Stop agitator.   ³ Sampling.

Fermenter No. 2 represents a substantially higher yeast concentration than is common.

FERMENTER NO. 2
[20 gr./litre yeast—agitated]

| Hours | Temp., °F. | Gravity, °Plato | pH | Yeast Concentration, gr./litre |
|---|---|---|---|---|
| 0 | 61½ | 11.35 | 4.5 | 22 |
| 5 | 65 | 10.20 | 4.4 | 28 |
| 11½ | 70¾ | 6.85 | 3.9 | 37 |
| 18½ | 70½ | 2.70 | 3.75 | 38 |
| 23¾ | 70¾ | 2.40 | 3.85 | ¹ 48 |
| 28½ | 45 | | | |
| 28¾ | 45 | | | 1.0 |

¹ Start cooling.

The product after cooling was stored for two weeks, bottled and sampled after two weeks in bottle. The product from fermenters No. 1 and No. 2 had a distinct off flavour. It was aromatic in the sense that it was harsh, estery, fruity. It had a caramellized flavour; it had a musty, cellary taste.

It will be noted that in both cases the fermenters were agitated, that in fermenter No. 1 the yeast propagation of the fermentation process was substantially completed at about 23 hours as determined by a levelling off of the yeast concentration, and that in fermenter No. 2 the yeast propagation of the fermentation process was substantially completed at about 11 hours. In each case temperature was permitted to rise uncontrolled during this period and this is the cause of the poor product.

In a third and fourth fermenter ale wort was pitched with yeast at 18 grams of yeast per litre of wort at 65° F., held at this temperature for eight hours and then raised to 75° F. for the remainder of the fermentation and until a gravity of 2.4° Plato was reached. The fermenters were mechanically agitated as in the Examples 1 and 2. The product was then held for 10 hours, following which it was cooled within a period of 1½ hours to 40° F. A sample from each fermenter was taken, stored for four weeks and tasted. The ale product was free of objectionable off flavours, commonly known as aromatic caramellized or fruity. The following charts represent the progress of the fermentation in fermenters No. 3 and No. 4:

FERMENTER NO. 3

[Pitched at 65° F., held at this temperature for 8 hours, then raised to 75° F. for the remainder of the fermentation. After 2.4° Plato, 10 hours holding, then 1½ hours cooling to 40° F.]

| Hours | Temp., °F. | Gravity, °Plato | pH | Yeast Concentration, gr./litre |
| --- | --- | --- | --- | --- |
| 0 | | | | 18 |
| 1 | 65 | 11.1 | 3.9 | 20 |
| 4 | 65 | 10.4 | 3.8 | 22 |
| 8 | 65 | 9.1 | 3.7 | 28 |
| 8½ | 75 | 8.7 | 3.7 | 28 |
| 12 | 75 | 6.1 | 3.5 | 35 |
| 16 | 75 | 3.5 | 3.3 | 30 |
| 19 | 75 | 3.0 | 3.35 | 29 |
| 21 | 75 | 2.60 | 3.35 | 28 |
| 23 | 75 | 2.4 | 3.3 | 30 |
| | | Start of 10 hour holding | | |
| 33 | 75 | 2.2 | 3.4 | 40 |
| | | Start of cooling | | |
| 34½ | 40 | 2.3 | 3.4 | 40 |

FERMENTER NO. 4

[Pitched at 65° F., held at this temperature for 16 hours, then raised to 75° F. for remainder of fermentation. After 2.4° Plato, sampled like fermenter No. 3]

| Hours | Temp., °F. | Gravity, °Plato | pH | Yeast Concentration, gr./litre |
| --- | --- | --- | --- | --- |
| 0 | | | | 18 |
| 1 | 65 | 11.3 | 4.05 | 20 |
| 4 | 65 | 10.7 | 3.85 | 22 |
| 8 | 65 | 9.4 | 3.7 | 28 |
| 12 | 65 | 7.7 | 3.7 | 30 |
| 16 | 65 | 6.1 | 3.5 | 35 |
| 17 | 75 | 5.4 | 3.5 | 35 |
| 19 | 75 | 4.5 | 3.45 | 1 32 |
| 21 | 75 | 3.4 | 3.4 | 24 |
| 23 | 75 | 3.0 | 3.4 | 22 |
| 25 | 75 | 2.75 | 3.35 | 24 |
| 27 | 75 | 2.4 | 3.40 | 24 |
| | | Start of 10 hour holding | | |
| 37 | 75 | 2.2 | 3.4 | 35 |
| | | Start of cooling | | |
| 39½ | 40 | 2.2 | 3.4 | 35 |

[1] Purging.

It will be noted that substantially all of the yeast propagation had taken place at about 8 hours in each example, as indicated by the levelling off of the yeast concentration, and the result indicates that there was no real advantage, from the point of view of aromatic flavours, in maintaining the lower temperature beyond the 8-hour period. A comparison of the two tests also indicates that the fermentation was substantially accelerated by going to the higher temperature 8 hours sooner.

The invention is the maintenance of a low temperature during yeast propagation and subsequently taking advantage of the faster fermentation techniques by raising the temperature.

It will be noted that in fermenter No. 4 after about 19 hours of fermentation the yeast concentration decreased. This was the result of a purging of the fermenter of yeast entrained in carbon dioxide. It does, of course, decrease the yeast population and is from that point of view an undesirable thing.

A further fermentation carried out in fermenter No. 5 illustrates the effect of temperature in shortening fermentation time without imparting an objectionable flavour, provided that the initial temperature is maintained low. A most satisfactory product, from the point of view of flavour, was achieved in fermenter No. 5, to be described.

In this instance ale yeast was pitched at a yeast concentration of about 22 grams per litre, maintained at a temperature of about 65° F. for about 8 hours, and then quickly raised to about 70° F. by means of hot water jackets around the fermenter in which water temperature is controlled. These jackets were used throughout for control of temperature in all fermenters. They are of standard design and the water jacket technique of raising temperature is well known in the art. Following that it was raised slowly to about 80° F. and the fermentation was completed at about 80° F. Following is the chart of readings taken:

FERMENTER NO. 5

| Hours | Temp., °F. | Gravity, °Plato | pH | Yeast Concentration, gr./litre |
| --- | --- | --- | --- | --- |
| 0 | 65 | | | 22 |
| 1 | 65 | 11.6 | 4.55 | 22 |
| 4 | 65 | 10.9 | 4.45 | 26 |
| 8 | 65 | 9.7 | 4.45 | 31 |
| 12 | 75 | 7.1 | 4.20 | 1 35 |
| 16 | 80 | 4.0 | 4.00 | 32 |
| 18 | 80 | 3.1 | 3.95 | 2 20 |
| 20 | 80 | 2.8 | 4.00 | 18 |
| 22 | 80 | 2.7 | 3.95 | 19 |
| 24 | 80 | 2.6 | 4.00 | 21 |
| 26 | 80 | 2.4 | 4.00 | 28 |
| | | Start holding for 2 hrs. | | |
| 28 | 80 | 2.2 | 4.00 | 30 |
| | | Start cooling | | |
| 30 | 40 | | | |
| 31 | 40 | 2.2 | 4.00 | 1.5 |

[1] Start of purging. [2] End of purging (5 hrs.).

The reduced temperature to which the substrate must be held during the initial stages of fermentation varies with the amount of aromatic flavours that can be tolerated and, to some extent, with the yeast used. With ale or top fermenting yeasts it has been found that the initial temperature should be maintained below 65° F. with a lager or bottom fermenting yeast it has been found that the temperature should be maintained somewhat lower than this to achieve an acceptable aromatic flavour level. The essence of the invention is controlled and relatively slow fermentation during the critical period when yeast propagation is taking place, followed by relatively fast fermentation at a higher temperature after most of the yeast propagation has taken place when the substrate is agitated.

The lower limit of the temperature is an emperical thing to some extent. It, of course, will be as high as possible consistent with a low production of off flavours and, in any event, high enough to give a reasonable fermentation speed. It should as a practical matter always be above 45° F. where reasonable fermentation ceases.

The yeast concentration at pitching is variable in accordance with brewing practice. The advantages of this invention can certainly be obtained with a pitching concentration of 4 grams of yeast per litre of wort and the expedient of agitation is used. This concentration, however, is on the low side for the accelerated techniques and concentrations of between 15 and 30 grams of yeast per litre of wort are generally considered more practical. At concentrations of over 30 grams of yeast per litre of wort one often encounters handling problems due to yeast action. These, however, may be overcome by techniques not related to this invention, which, as indicated above, essentially consists of using the accelerated techniques of agitation and high fermentation temperatures but keeping the temperature of the substrate low during the yeast propagation period of the process to inhibit the production of off flavours. Moreover temperature selection during the part of the process after the yeast propagation stage is capable of variation beyond the scope of this invention. Here, again, it is well known that higher temperatures increase the speed of the process and the relationships are known. This invention is the avoidance of these high temperatures during the yeast propagation stage.

As indicated above, jackets extending around the fermenter adapted to take either brine or controlled temperature water were used to maintain the temperature in the examples given. The fermenter in the case of the examples given was some 27 inches deep and a jacket having a depth of about 9 inches extending around the side of the fermenter was found to be suitable. Controlled temperature water was used in the examples of the invention given.

Embodiments of the invention other than those set forth in this application will be apparent to those skilled in the art, and it is not intended that the application should be limited thereby.

We claim:

1. In a process of producing a potable beverage by the fermentation of a yeast fermentable substrate wherein the substrate is pitched with a top fermenting yeast at a concentration of at least 3 grams of yeast per litre of substrate, the steps of agitating the substrate to keep the yeast in suspension in the substrate, maintaining the temperature of the substrate at a fermentation temperature below 65° F. only until the yeast propagation of the fermentation process is substantially completed to inhibit the production of off flavours and then raising the temperature of the substrate to a fermentation temperature above 70° F. to accelerate the fermentation process.

2. In a process of producing a potable beverage by the fermentation of a yeast fermentable substrate wherein the substrate is pitched with a top fermenting yeast at a concentration of at least 15 grams per litre of substrate, the steps of agitating the substrate to keep the yeast in suspension in the substrate, maintaining the temperature of the substrate at a fermentation temperature below 65° F. only until the yeast propagation of the fermentation process is substantially completed to inhibit the production of off flavours and then raising the temperature of the substrate to a fermentation temperature above 70° F. to accelerate the fermentation process.

3. In a process of producing a potable beverage by the fermentation of a yeast fermentable substrate wherein the substrate is pitched with a bottom fermenting yeast at a concentration of at least 3 grams of yeast per litre of substrate, the steps of agitating the substrate to keep the yeast in suspension in the substrate, maintaining the the temperature of the substrate at a fermentation temperature below 55° F. only until the yeast propagation of the fermentation process is substantially completed to inhibit the production of off flavours and then raising the temperature of the substrate to a fermentation temperature above 60° F. to accelerate the fermentation process.

4. In a process of producing a potable beverage by the fermentation of a yeast fermentable substrate wherein the substrate is pitched with a bottom fermenting yeast at a concentration of at least 15 grams per litre of substrate, the steps of agitating the substrate to keep the yeast in suspension in the substrate, maintaining the temperature of the substrate at a fermentation temperature below 55° F. only until the yeast propagation of the fermentation process is substantially completed to inhibit the production of off flavours and then raising the temperature of the substrate to a fermentation temperature above 60° F. to accelerate the fermentation process.

References Cited

UNITED STATES PATENTS 3,345,179   10/1967   Pollock et al. _____ 99—31

FOREIGN PATENTS 274,225   7/1927   Great Britain.

OTHER REFERENCES

Clerck: A Textbook of Brewing, Chapman & Hall, London (1957), vol. 1 (pp. 408–411).

LIONEL M. SHAPIRO, *Primary Examiner.*

D. M. NAFF, *Assistant Examiner.*

U.S. Cl. X.R.

99—38, 41, 47